Figure 1:
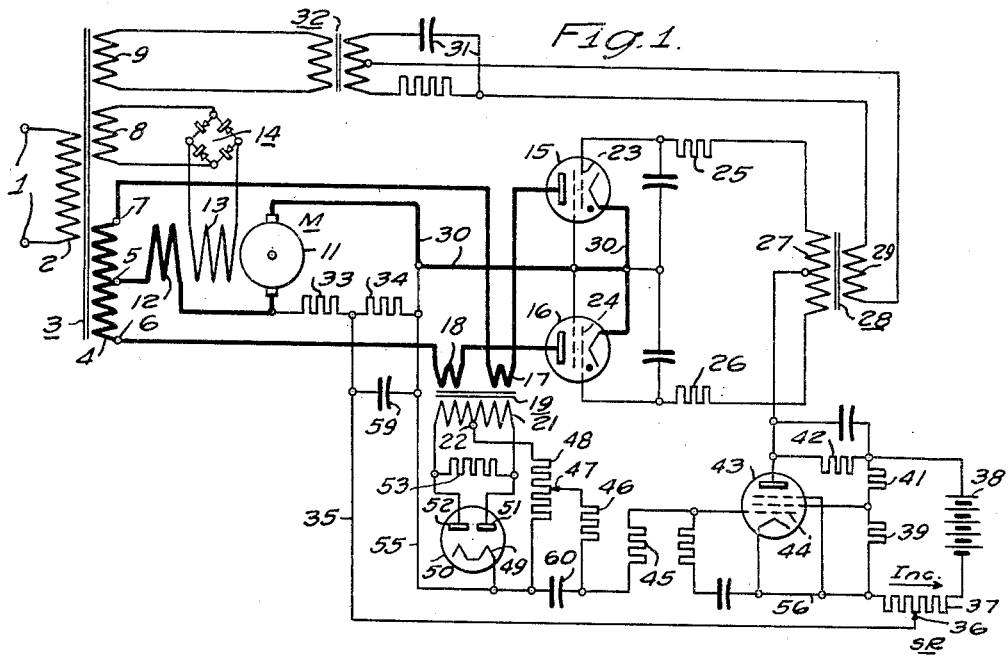

July 25, 1950  J. G. HANEIKO  2,516,568
ELECTRONIC CONTROL SYSTEM FOR DIRECT-CURRENT MOTORS
Filed May 5, 1948

WITNESSES:
E. A. M'Closkey
New. L. Groome

INVENTOR
John G. Haneiko.
BY C. M. Avery
ATTORNEY

Patented July 25, 1950

2,516,568

UNITED STATES PATENT OFFICE 2,516,568

ELECTRONIC CONTROL SYSTEM FOR DIRECT-CURRENT MOTORS

John G. Haneiko, East Aurora, N. Y., assignor to Westinghouse Electric Corporation, East Pittsburgh, Pa., a corporation of Pennsylvania Application May 5, 1948, Serial No. 25,155

7 Claims. (Cl. 318—331)

My invention relates to electronic systems for energizing a direct-current motor from an alternating-current source to run at controllable speed.

It is an object of the invention to improve and simplify such systems as regards their IR-drop compensating components and performance, i. e. as regards those circuits and devices of the system that stabilize undesired variations of the motor speed due to changes in motor armature current as may be caused by changes in the load or torque requirements of the motor.

In the known electronic control systems of this kind, current is supplied to the armature of a separately excited direct-current motor from an alternating-current source through a controllable rectifier. As a rule, a pair of rectifying tubes of the gaseous type, such as thyratrons or ignitrons, are arranged to conduct current to the armature in successive half-periods of alternating current voltage. The amount of current supplied to the armature depends upon the instant at which the conduction through the rectifier tubes is initiated relative to the half-period of the source in which the tube is capable of conducting. To control the firing point, each rectifier tube has a control circuit impressed by variable control voltage. As a rule, the control voltage is the resultant of an alternating-voltage component of fixed magnitude and a given phase displacement relative to the voltage of the alternating-current source, and of a second component voltage which is unidirectional and of variable magnitude. The uni-directional control voltage is made up primarily of a substantially constant component and a variable component derived from an auxiliary direct-current source through a master control tube. The master control tube is so connected that the magnitude of the variable component voltage depends upon the conductivity of the master control tube. For purposes of speed regulation, the conductivity of the master control tube is varied in accordance with the setting of a speed control rheostat as well as in accordance with the armature voltage and the armature current of the motor.

In the known systems, only the just-mentioned component control voltages proportional to the motor armature voltage and the control voltage determined by the setting of the speed control rheostat are directly applied to the grid circuit, while the control voltage proportional to the armature current is applied to the grid circuit through an electronic arrangement, which includes an auxiliary amplifier tube. The plate circuit of the auxiliary tube is energized from a separate source of direct-current voltage and its grid circuit is controlled by signal voltage derived from the armature circuit of the motor.

It is a more specific object of my invention to simplify control systems of the type above referred to by eliminating the auxiliary amplifier tube and the appertaining tube circuits for applying the current responsive grid voltage to the master control tube of the system, thus reducing the number of system components and the cost of the equipment while also facilitating the adjustment of the control system.

Another more specific object of the invention is to design the supply means of the current-responsive grid voltage for the master control tube in such a manner as to secure a high stability of this component grid voltage.

Figure 2:
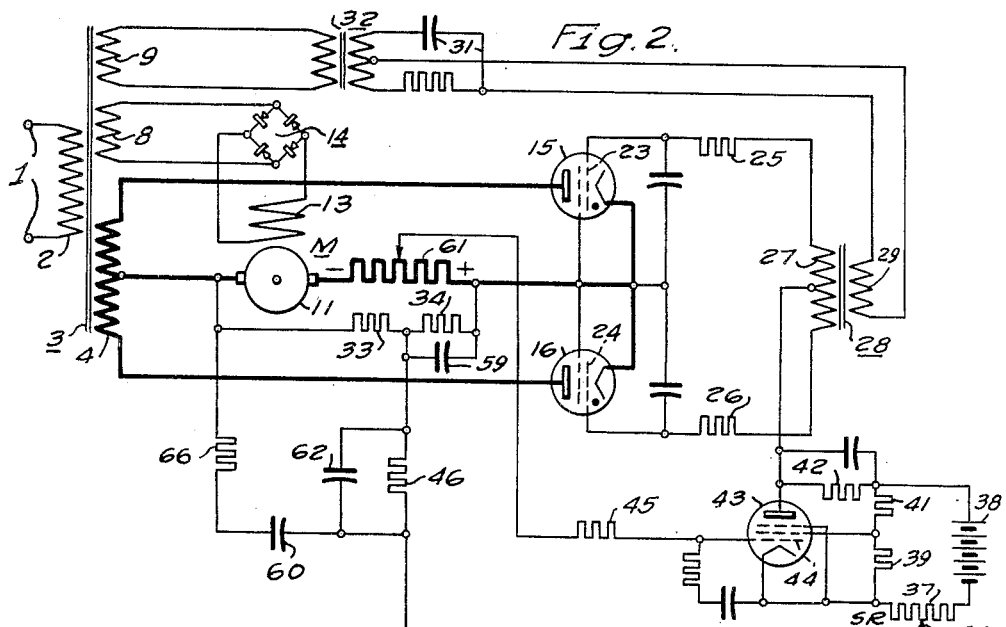

In order to achieve these objects, systems according to the invention are designed as set forth in the annexed claims and apparent from the following description of the two motor control systems exemplified by the circuit diagrams shown in Figs. 1 and 2, respectively, of the drawing.

The alternating current terminals 1 of the control system shown in Fig. 1 are connected to the primary 2 of a power transformer 3 whose main secondary winding 4 has a tap 5 located in the midposition between the terminals 6 and 7 of the winding. Transformer 3 is equipped with two additional secondaries 8 and 9.

The armature 11 and a series field winding 12 of motor M are connected to the tap point 5 in series relation to each other. The main field winding 13 of the motor is separately energized by substantially constant voltage through a rectifier 14 from the secondary 8 of transformer 3. Two rectifier tubes 15 and 16, for instance thyratrons, have their respective anodes connected to the terminals 7 and 6 of the transformer secondary 4 in series with the respective primary windings 17 and 18 of a transformer 19 whose secondary 21 has a center tap 22. The control electrodes or grids 23 and 24 of respective tubes 15 and 16 are connected through series resistors 25 and 26 across a center-tapped secondary 27 of a phase shift transformer 28 whose primary 29 is connected through a phase shift circuit 31 with an appertaining transformer 32 to the secondary 9 of the power transformer 3.

The tubes 15 and 16 have a common cathode lead 30 which forms part of the motor armature circuit. Two resistors 33 and 34 are connected in series with each other across the motor armature 11. A circuit point between resistors 33 and 34 is connected through a lead 35 to the slider 36 of a speed control rheostat SR whose resistor 37 is connected across a suitable source 38 of constant direct-current voltage in series with two resistors 39 and 41. Resistors 39 and 41 are also series-connected with a resistor 42 which is disposed in the plate circuit of a master control tube 43. This plate circuit is energized from the constant voltage source 38 and includes also the above-mentioned resistor 37 of the speed control rheostat SR.

Tube 43 is a vacuum tube and may consist of a pentode, as shown. Its control grid 44 is connected through a resistor 45 and a resistor 46 with the slider or tap point 47 of a potentiometric rheostat 48. One terminal of rheostat 48 is connected to the tap point 22 of the secondary winding 21 of transformer 19. The other terminal of rheostat 48 is connected to the cathode 49 of a twin diode 50 or the like rectifying apparatus. The two anodes 51 and 52 of tube 50 are connected to respective terminals of the secondary 21. A load resistor 53 is connected across the secondary 21.

The magnitude of the rectified voltage and current applied to the armature 11 of motor M depends upon the average conductance of the rectifier tubes 15 and 16 and hence on the firing point of these tubes. This firing point is controlled by the control potential impressed between the cathodes and control electrodes, respectively, of the rectifier tubes by means of appertaining control or grid circuits.

The control circuit for tube 15 extends from grid 23 through resistor 25 and one-half of the secondary winding 27 of the phase shift transformer 28 to the center tap of winding 27. The grid circuit for tube 16 extends from grid 24 through resistor 26 and the other half of secondary winding 27 to the same center tap. From then on, both grid circuits extend through resistor 42, resistor 41, resistor 39, part of resistor 37 to the slider 36 of the speed control rheostat SR, thence through lead 35 and resistor 34 to the common cathode lead 30 of the tubes 15 and 16. This control circuit of tubes 15 and 16 is impressed by five voltages, as explained presently.

The secondary 27 of phase shift transformer 28 provides the control circuit with an alternating voltage of the same frequency as that effective across the secondary winding 4 of the power transformer 3, but the phase of the alternating voltage impressed on the grid circuit is displaced by the phase shift circuit 31, preferably so that it lags 90° behind the voltage of secondary winding 4.

A constant direct-current voltage is impressed on the rectifier control circuit across the resistors 39 and 41. This constant voltage results from the voltage drop caused in these resistors by the current from source 38. The polarity of the voltage across resistors 39 and 41 tends to make the control grids 23 and 24 of rectifier tubes 15 and 16 positive with respect to the cathodes. Another direct-current voltage is applied to the grid circuit from across the resistor 42. The magnitude of this voltage depends upon the conductivity of the master control tube 43 and varies in dependence upon the voltage condition of the appertaining grid circuit in the manner explained in a later place.

A unidirectional voltage, effective in the grid circuit of rectifier tubes 15 and 16, appears also across the tapped-off portion of resistor 37 between slider 36 and the point of attachment to resistor 39. This voltage depends upon the adjustment of slider 36, but its magnitude is small compared with the above-mentioned other voltages so that its effect on the control of the rectifier tubes is negligible.

A variable voltage appears also across the resistor 34. This voltage is proportional to the terminal voltage of the motor armature 11, but it is also so small as to have no effect on the control of the rectifier tubes 15 and 16. Besides, this voltage is substantially cancelled by the voltage from rheostat 37.

It follows from the foregoing that the resultant grid-cathode voltage applied to the rectifier tubes 15 and 16 is primarily comprised of the phase shifted alternating voltage supplied through transformer 28, the constant unidirectional voltage supplied by resistors 39 and 41, and the variable unidirectional voltage supplied by the resistor 42. These three voltages are so proportioned that when the master control tube 43 conducts maximum current, the negative potential caused by the voltage across resistor 42 (first resistor) is of such a magnitude as to prevent the resultant grid-cathode potential of the rectifier tubes from rising above the critical value necessary to render the rectifier tubes conductive. If the conductivity of the master control tube 43 decreases, the resultant grid-cathode potential impressed on the rectifier tubes 15 and 16 rises above the critical value so that the firing point of the rectifier tubes is advanced and causes these tubes to conduct an amount of current through the motor armature which increases with decreasing conductivity of the master control tube.

The conductivity of control tube 43 depends upon the grid-cathode potential applied to this tube by the appertaining grid circuit. The grid circuit can be traced from grid 44 through resistor 45 and resistor 46 to a tap point 47 of rheostat 48, and through the tapped portion of rheostat 48, lead 55, resistor 34 and lead 35 to the slider 36 of speed control rheostat SR, and thence through the tapped portion of resistor 37 to the cathode lead 56 of control tube 43. This grid circuit is impressed by three voltages whose resultant effect determines the grid cathode potential.

The first grid voltage is provided by the portion of resistor 37 tapped off by the slider 36 in speed control rheostat SR. This voltage and consequently the selected adjustment of the slider 36 determine the speed at which the motor M is intended to run.

Another voltage is impressed on the grid circuit of control tube 43 by the resistor 34 (second resistor). As mentioned, this voltage varies in proportion to the armature voltage of motor M. The polarity of this variable voltage opposes that of the above-mentioned control voltage derived from the speed control rheostat SR.

A third voltage is impressed on the grid circuit of control tube 43 from the tapped-off portion of rheostat 48 (third resistor) between tap 47 and lead 55. This third voltage is supplied through the rectifier 50 from the transformer 19. Since transformer 19 is energized by the motor load current flowing through the rectifier tubes 15 and 16, the rectified voltage across rheostat 48, and hence the voltage impressed on the grid circuit of the control tube 43 varies in proportion to the armature current and is a measure of IR drop in the motor armature circuit.

Disregarding for a moment the effect of the last-mentioned voltage from rheostat 48 and assuming that the load or torque of motor M remains constant, the conductivity of the master control tube 43, and therefore the firing point of the rectifier tubes 15 and 16, and the speed of the motor M are determined only by the selected setting of the control rheostat SR. As the adjustable tap 36 is moved away from the end of the resistor 37 connected to lead 56, the speed of the motor is increased. If the torque varies, the armature voltage varies accordingly, and so does the voltage impressed on the grid circuit of control tube 43 from across the resistor 34. The polarity of the voltage across resistor 34 is such that an increase in torque acts through resistor 34 to decrease the conductivity of the master control tube 43 in order to advance the firing point of the rectifier tubes 15 and 16. Conversely, the voltage across resistor 34 causes the grid circuit of control tube 43 to delay the firing point of rectifier tubes 15 and 16 in response to a decrease in torque. In this manner, the system compensates for variation in armature voltage due to variations in load.

The above-mentioned third voltage impressed on the grid circuit of control tube 43 from resistor 48 (third resistor) acts cumulatively with respect to the adjusted voltage from speed control rheostat SR, and in this manner compensates for variations of the armature voltage due to the IR drop in the armature circuit. If the load current increases and causes the motor speed to drop from the desired value due to the reducing effect of the IR drop on the armature terminal voltage, the rectifying voltage impressed through tube 50 across the potentiometer resistor 48 increases. As a result, the grid circuit behaves as if the speed control voltage adjusted at the rheostat SR were slightly increased, and the firing point of the rectifier tubes 15 and 16 is shifted to increase the armature voltage of the motor an amount sufficient to compensate for IR-drop responsive speed variations.

It will be recognized that in the above-described control system the grid voltage that measures the IR drop of the motor armature circuit and appears across the resistor 48 is not supplied from a separate source through an amplifier tube but is caused by the motor armature current itself. In this manner, the additional amplifying equipment heretofore used for this purpose is eliminated and the design and adjustment of the system as a whole correspondingly simplified.

Due to the fact that the current measuring component grid voltage for the control tube 43 is caused by the rectifier armature current, the sometimes appreciable irregularities of this current may be transferred into the grid circuit of the control tube and may affect the stability of the control voltage across resistor 42 thus affecting the accuracy of the control performance.

In a system according to the invention, however, such disturbing effects are minimized by the performance of the resistor 46 series connected to the slider 47 of the potentiometric rheostat 48, in conjunction with a capacitor 60 which is series connected with the resistor 46 across the tapped off portion of the rheostat 48. When a rapid voltage change occurs across the tapped off portion of rheostat 48, the capacitor 60 varies its charge and passes a charging or discharging current through the loop circuit formed by resistor 46 and the active portion of rheostat 48. This capacitive current impresses on the loop circuit a voltage with the effect of minimizing the cause of the disturbing voltage change. For instance, any sudden rise in voltage across rheostats 48 causes a flow of current through the capacitor 60 during the interval of voltage change. This current produces across the resistor 46 a voltage which makes the grid of the grid 44 more positive relative to the cathode and thereby changes the voltage drop across resistor 42 with the effect of delaying the firing of rectifier tubes 15 and 16. As a result, the current through the armature circuit is reduced to the extent required for preventing the rise in voltage across rheostat 48.

The motor control system shown in Fig. 2 is largely similar to that according to Fig. 1, and represents a modification of the circuit means which connect the grid circuit of the master control tube 43 with the motor armature circuit for deriving from the latter a voltage proportional to the IR drop in the armature circuit. Circuit elements of the modified system shown in Fig. 2 that correspond to elements of Fig. 1 are denoted by the same respective reference characters. Since the performance of the system of Fig. 2 as a whole is similar to that of the system previously described, the following description is limited to the modified features.

The essential difference of the system shown in Fig. 2 from that of Fig. 1 consists in the fact that the rectifier tube 50 and the transformer 19 of Fig. 1 are eliminated. The armature circuit includes a low ohmic series resistor 61. The voltage drop across resistor 61 is proportional to the armature current and hence a measure of the IR drop. The grid circuit of the control tube 43 extends from control grid 44 through resistors 45, 61, 34, 66, to the speed-control rheostat 37, then back to the cathode of tube 43. The voltage drop across resistor 34 is proportional to the armature voltage and opposed to the voltage taken from resistor 61. Consequently, the resultant voltage impressed across the series-arrangement of resistors 61 and 33 corresponds to the differential value of motor terminal voltage and IR drop. By properly proportioning the ratio of the two voltage drops, the resultant voltage can be made proportional to the counter E. M. F. of the motor which is substantially proportional to the motor speed. More in detail, with increase in armature current, an increasing negative voltage is applied from resistor 61 to the grid of tube 43. As a result, the voltage across resistor 34 is reduced and the firing angle of thyratrons 15, 16 is advanced. The portion of armature voltage across resistor 34 approximately balances the voltage across the effective portion of rheostat 37. As a rule, the voltage across resistor 34 may be about one-fifth of the total armature voltage.

Resistor 46 and capacitor 60 and resistor 66 form a stabilizing circuit, and capacitors 59 and 62 serves as filters. As long as the armature voltage is stable, no voltage is impressed across resistor 46. In the event of a sudden change in armature current and voltage, a corresponding change appears in the voltage drop across resistor 33 so that the capacitor 60 varies its charge and impresses a voltage across resistor 46 which is effective in the grid circuit of tube 43 in the same stabilizing manner as explained above with reference to capacitor 60 and resistor 46 in Fig. 1.

It will be understood by those skilled in the art that systems according to the invention can be modified in various respects without departing from the subjects and essence of the invention and within the essential features of the invention set forth in the claims annexed hereto.

I claim as my invention:

1. An electronic motor control system, comprising alternating-current supply means, a direct-current motor, a controllable rectifier tube series-connected with said motor across said supply means and having a control circuit with voltage supply means for controlling the current rectified by said tube and traversing said motor, said voltage supply means including a first resistor, a control tube having a plate circuit extending through said resistor to impress thereon a variable voltage and having a grid circuit for controlling said variable voltage, adjustable direct-current supply means connected with said grid circuit to impress thereon an adjusted voltage in accordance with a desired motor speed, a second resistor disposed in said grid circuit and connected across said motor to apply to said grid circuit a variable voltage in accordance with the motor terminal voltage and in oppositon to said adjusted voltage, circuit means series-connected with said motor and said rectifier tube to be traversed by said current and having a third resistor for developing a voltage drop caused by said current, a fourth resistor and a capacitor connected in series with each other across said third resistor, and said third and fourth resistors being series-connected with each other in said grid circuit to provide IR-drop compensating voltage for said grid circuit.

2. An electronic motor control system, comprising alternating-current supply means, a direct-current motor, a controllable rectifier tube series-connected with said motor across said supply means and having a control circuit with voltage supply means for controlling the current rectified by said tube and traversing said motor, said voltage supply means including a first resistor, a control tube having a plate circuit extending through said resistor to impress thereon a variable voltage and having a grid circuit for controlling said variable voltage, adjustable direct-current supply means connected with said grid circuit to impress thereon an adjusted voltage in accordance with a desired motor speed, a second resistor disposed in said grid circuit and connected across said motor to apply to said grid circuit a variable voltage in accordance with the motor terminal voltage and in opposition to said adjusted voltage, a transformer series-connected with said motor and said rectifier tube, a third resistor, a rectifier having an input circuit connected across said transformer and an output circuit connected across said third resistor, and said third resistor being connected in said grid circuit to provide it with corrective voltage for IR-drop compensation.

3. An electronic motor control system, comprising alternating-current supply means, a direct-current motor, a controllable rectifier tube series-connected with said motor across said supply means and having a control circuit with voltage supply means for controlling the current rectified by said tube and traversing said motor, said voltage supply means including a first resistor, a control tube having a plate circuit extending through said resistor to impress thereon a variable voltage and having a grid circuit for controlling said variable voltage, adjustable direct-current supply means connected with said grid circuit to impress thereon an adjusted voltage in accordance with a desired motor speed, a second resistor disposed in said grid circuit and connected across said motor to apply to said grid circuit a variable voltage in accordance with the motor terminal voltage and in opposition to said adjusted voltage, a transformer series-connected with said motor and said rectifier tube, a third resistor, a rectifier having an input circuit connected across said transformer and an output circuit connected across said third resistor, a fourth resistor and a capacitor connected in series with each other across said third resistor, and said third and fourth resistors being series-connected with each other in said grid circuit to provide IR-drop compensating voltage for said grid circuit.

4. An electronic motor control system, comprising alternating-current supply means having a transformer winding with two terminal points and a mid-point, a separately-excited direct-current motor having an armature, two controllable rectifier tubes plate-connected to said respective terminal points and having a common cathode lead connected to said midpoint in series with said armature, said rectifier tubes having respective control circuits having a common circuit portion and voltage supply means for controlling the current rectified by said tubes, said voltage supply means including a first resistor disposed in said common circuit portion, a control tube having a plate circuit extending through said resistor to impress thereon a variable voltage and having a grid circuit for controlling said variable voltage, adjustable direct-current supply means connected with said grid circuit to impress thereon an adjusted voltage in accordance with a desired motor speed, a second resistor disposed in said grid circuit and connected across said motor to apply to said grid circuit a variable voltage in accordance with the motor terminal voltage and in opposition to said adjusted voltage, a rectifier, a transformer having two primaries series-connected between said rectifier tubes and said terminal points respectively and having a secondary connected to said rectifier, said rectifier having an output circuit provided with a third resistor, and said fourth resistor being connected in said grid circuit to impress thereon a corrective voltage for IR-drop compensation.

5. An electronic motor control system, comprising alternating-current supply means having a transformer winding with two terminal points and a tapped midpoint, a separately-excited direct-current motor having an armature, two controllable rectifier tubes plate-connected to said respective terminal points and having a common cathode lead connected to said midpoint in series with said armature, said rectifier tubes having respective control circuits having a common circuit portion and voltage supply means for controlling the current rectified by said tubes, said voltage supply means including a first resistor disposed in said common circuit portion, a control tube having a plate circuit extending through said resistor to impress thereon a variable voltage and having a grid circuit for controlling said variable voltage, adjustable direct-current supply means connected with said grid circuit to impress thereon an adjusted voltage in accordance with a desired motor speed, a second resistor disposed in said grid circuit and connected across said motor to apply to said grid circuit a variable voltage in accordance with the motor terminal voltage and in opposition to said adjusted voltage, a rectifier, a transformer having two primaries series-connected between said rectifier tubes and said terminal points respectively and having a secondary connected to said rectifier, said rectifier having an output circuit provided with a third resistor having a tapped-off portion, a fourth resistor and a capacitor series-connected with each other across said portion, and said fourth resistor being series-connected with said portion in said grid circuit to impress thereon an IR-drop compensating voltage cumulative to said adjusted voltage.

6. An electronic motor control system, comprising alternating-current supply means, a direct-current motor, having a separately excited field winding and an armature, a controllable rectifier series-connected with said armature across said current supply means and having a control circuit for controlling the rectified current traversing said armature, a control tube having a plate circuit with a load resistor, said load resistor being connected in said control circuit to impress thereon a variable voltage, said tube having a grid circuit for controlling said variable voltage, adjustable direct-current supply means connected with said grid circuit to impress thereon an adjusted voltage in accordance with a desired motor speed, a first resistor series-connected with said armature, a second resistor connected across said series connection of armature and first resistor so as to be impressed by voltage substantially proportional to the motor speed, said second resistor having a portion connected in said grid circuit to impress thereon a variable grid voltage in opposition to said adjusted voltage, a third resistor series-connected with said portion in said grid circuit, and a capacitor series-connected with said third resistor across at least part of said second resistor for stabilizing said variable grid voltage.

7. An electronic motor control system, comprising alternating-current supply means, a direct-current motor, a controllable rectifier tube connecting said motor to said supply means and having a control circuit with voltage supply means for controlling the motor speed, said voltage supply means including a first resistor, a control tube having a plate circuit extending through said resistor to impress thereon a variable voltage and having a grid circuit for controlling said variable voltage, adjustable direct-current supply means connected with said grid circuit to impress thereon an adjusted voltage component, a second resistor connected with said motor for providing a voltage drop proportional to an electric condition of said motor and connected in said grid circuit to impress thereon a variable grid voltage component, a third resistor series-connected in said grid circuit, and a capacitor, said third resistor and part of said second resistor being connected in series relation to each other across said capacitor for stabilizing said variable grid voltage component.

JOHN G. HANEIKO.

REFERENCES CITED

The following references are of record in the file of this patent:

UNITED STATES PATENTS

| Number | Name | Date |
|---|---|---|
| 2,312,117 | Moyer et al. | Feb. 23, 1943 |
| 2,400,599 | Reeves | May 21, 1946 |
| 2,422,567 | Puchlowski | June 17, 1947 |